United States Patent
Chen et al.

(10) Patent No.: US 11,838,037 B2
(45) Date of Patent: Dec. 5, 2023

(54) SIGNAL PROCESSING DEVICE

(71) Applicant: Wistron NeWeb Corp., Hsinchu (TW)

(72) Inventors: Long Chen, Hsinchu (TW); Lisong Zhou, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 34 days.

(21) Appl. No.: 17/814,300

(22) Filed: Jul. 22, 2022

(65) Prior Publication Data
US 2023/0283305 A1 Sep. 7, 2023

(30) Foreign Application Priority Data

Mar. 1, 2022 (CN) .......................... 202210196451.1

(51) Int. Cl.
*H04B 1/00* (2006.01)
*H04B 1/18* (2006.01)

(52) U.S. Cl.
CPC ......... *H04B 1/0078* (2013.01); *H04B 1/0042* (2013.01); *H04B 1/18* (2013.01)

(58) Field of Classification Search
CPC ....... H04B 1/0078; H04B 1/0042; H04B 1/18
USPC ...................................................... 455/552.1
See application file for complete search history.

(56) References Cited

U.S. PATENT DOCUMENTS

| 9,219,518 | B1* | 12/2015 | Chen ......................... H04B 1/48 |
| 11,043,985 | B1 | 6/2021 | Labadie et al. |
| 2020/0106520 | A1* | 4/2020 | Wu ......................... H04B 10/64 |
| 2021/0076441 | A1* | 3/2021 | Guha ..................... H04W 40/20 |
| 2023/0040041 | A1* | 2/2023 | Jin ......................... H03F 1/0277 |

* cited by examiner

*Primary Examiner* — Tanmay K Shah
(74) *Attorney, Agent, or Firm* — McClure, Qualey & Rodack, LLP

(57) ABSTRACT

A signal processing device is provided. The signal processing device includes a proximal end device, a connection unit, and a distal end device. The proximal end device generates a first radio frequency signal. The connection unit is coupled to the proximal end device and receives and transmits the first radio frequency signal. The distal end device is coupled to the connection unit, receives the first radio frequency signal, performs a power detection on the first radio frequency signal to generate a detection signal, generates a control signal according to a comparison result of the detection signal and a predetermined reference value, and transmits the control signal to the connection unit. The proximal end device further receives the control signal through the connection unit, and adjusts the first radio frequency signal according to the control signal so as to generate a second radio frequency signal.

18 Claims, 2 Drawing Sheets

SIGNAL PROCESSING DEVICE

CROSS-REFERENCE TO RELATED PATENT APPLICATION

This application claims the benefit of priority to China Patent Application No. 202210196451.1, filed on Mar. 1, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a processing device, and more particularly, to a signal processing device.

BACKGROUND OF THE DISCLOSURE

The age of unmanned driving is coming, and so cellular vehicle-to-everything (C-V2X) communication which assists autonomous driving becomes especially important. For radio frequency signal transmission lines used in the C-V2X communication, higher carrier frequency means greater line loss.

However, because of the design and size of mobile devices, such as cars, the locations of the antenna and the communication module are often far apart, and the long radio frequency transmission line may cause a certain degree of signal loss, like 5 to 10 dB. The signal loss means a decrease in communication distance and quality, even to a point where the signal attenuation would cause the coverage of the radio frequency product to be so low that it does not work properly, thereby restricting subsequent technological development. Therefore, how to effectively adjust and compensate the signal attenuation loss of radio frequency signals is a major issue at present.

SUMMARY OF THE DISCLOSURE

In view of the aforementioned issues, the present disclosure provides a signal processing device that uses bi-directional linear close-loop control on radio frequency signals to adjust and compensate the signal transmission loss, so as to increase signal linearity and coverage and to enhance the convenience of utility.

It is an object of the present disclosure to provide a signal processing device that includes a proximal end device, a connection unit, and a distal end device. The proximal end device generates a first radio frequency signal. The connection unit is coupled to the proximal end device and receives and transmits the first radio frequency signal. The distal end device is coupled to the connection unit. The distal end device receives the first radio frequency signal, performs a power detection on the first radio frequency signal to generate a detection signal, and generates a control signal according to a comparison result of the detection signal and a predetermined reference value. The distal end device transmits the control signal to the connection unit. The proximal end device further receives the control signal through the connection unit and adjusts the first radio frequency signal according to the control signal so as to generate a second radio frequency signal.

The signal processing device provided by the present disclosure effectively performs bi-directional linear close-loop control on the radio frequency signal to adjust and compensate the signal transmission loss, which in turn increases signal linearity and coverage, and thereby enhancing convenience of use.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
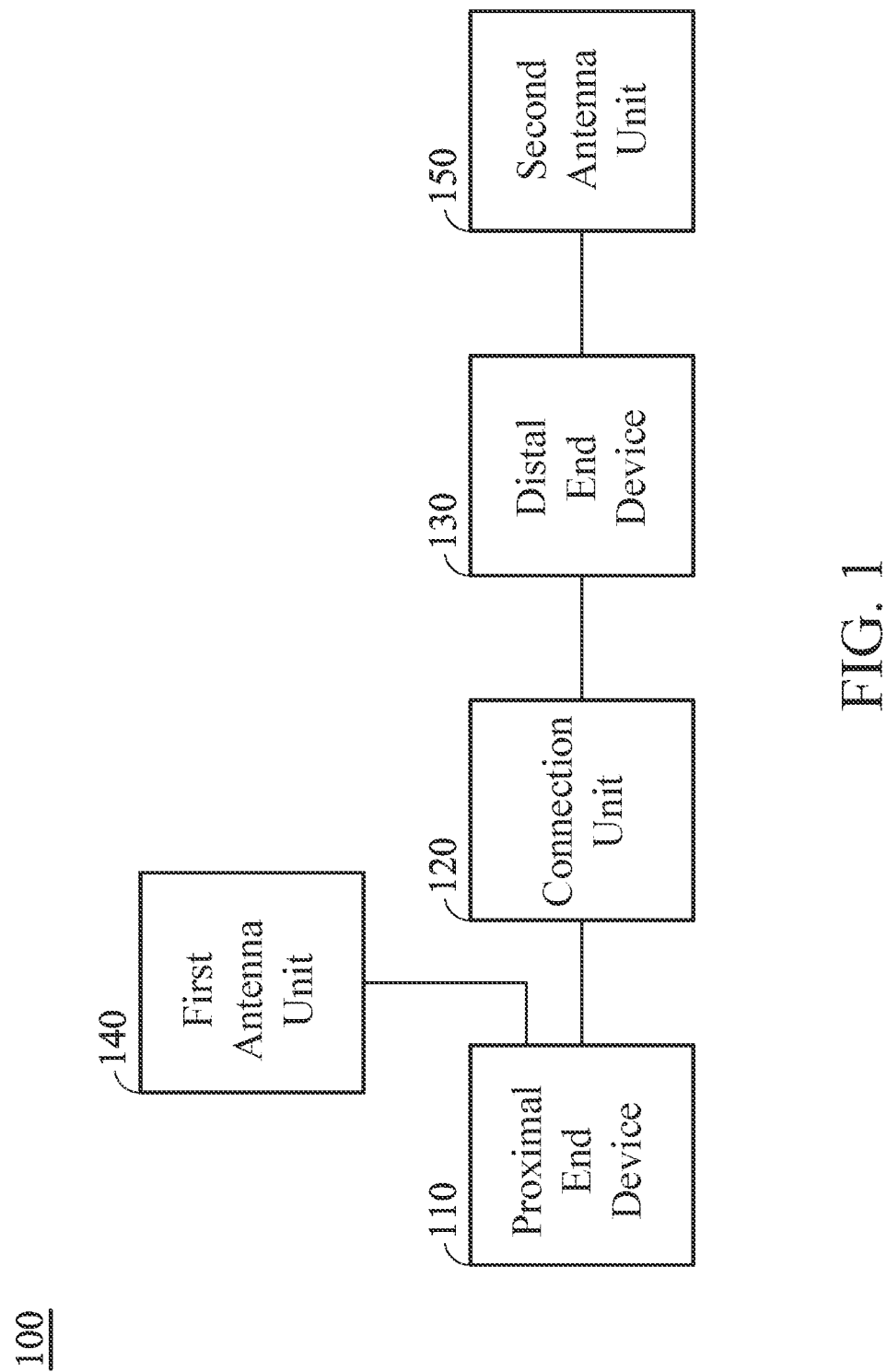
FIG. 1 is a schematic diagram of a signal processing device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In some embodiment of the present disclosure, the term "couple", may include any direct and indirect means of electrical connection unless otherwise defined.

Referring to FIG. 1, a signal processing device 100 includes a proximal end device 110, a connection unit 120, and a distal end device 130. It is to be noted that the signal processing device 100 is adapted to be used in a mobile device, such as an automobile, that has radio frequency signal transmission capability like C-V2X, but the present disclosure is not limited thereby.

The proximal end device 110 generates a first radio frequency signal (first RF signal). In this embodiment, the frequency range of the first RF signal is, for example, between 2 GHz and 10 GHz, but the present disclosure is not limited thereto.

The connection unit 120 is coupled to the proximal end device 110 and is used to receive and transmit the first RF signal. In this embodiment, the connection unit 120 is, for example, a radio frequency cable (RF cable).

The distal end device 130 is coupled to the connection unit 120 and is used to receive the first RF signal transmitted by the connection unit 120 and to perform a power detection on the first RF signal to generate a detection signal. For example, after receiving the first RF signal transmitted by the connection unit 120, the distal end device 130 performs a power detection on the first RF signal, such as converting the power value of the first RF signal to a voltage signal, and uses the voltage signal as the detection signal.

Next, the distal end device 130 generates a control signal based on a comparison result of the detection signal and a predetermined reference value. For example, the distal end device 130 compares the detection signal and the predetermined reference value first to generate the comparison result, so as to determine whether the detection signal is the same as or similar to the predetermined reference value. When the distal end device 130 determines that the comparison result is that the detection signal is the same as or similar to the predetermined reference value, the distal end device 130 does not generate the control signal.

In addition, when the distal end device 130 determines that the comparison result is that the detection signal is different from (not the same as and not similar to) the predetermined reference value, the distal end device 130 generates the control signal. Subsequently, the distal end device 130 transmits the control signal to the connection unit 120.

For instance, the distal end device 130 transmits the control signal to the connection unit 120 in a command form, and the communication protocol of the signal transmission includes protocols like inter-integrated circuit (I2C), universal asynchronous receiver/transmitter (UART), etc., but the present disclosure is not limited thereby.

Subsequently, the proximal end device 110 further receives the control signal through the connection unit 120. In other words, after generating the control signal, the distal end device 130 feeds back the control signal to the proximal end device 110 through the connection unit 120. The proximal end device 110 then adjusts the first RF signal according to the control signal so as to generate a second radio frequency signal (second RF signal). The adjustment is, for example, adjusting the signal parameter of the first RF signal, and the signal parameter includes values like signal gain, power index, etc., but the present disclosure is not limited thereto.

Then, the proximal end device 110 sends/transmits the second RF signal to the distal end device 130 through the connection unit 120, such that the parameters of the radio frequency signal transmitted by the distal end device 130 fulfills the needs. Therefore, the present disclosure achieves the adjustment and compensation of signal transmission loss by bi-directional linear close-loop control of the main power of the radio frequency signal through a connection unit 120, thereby increasing signal linearity and signal coverage and enhancing convenience of use.

In some embodiments, when the distal end device 130 determines the comparison result to be that the detection signal is different from the predetermined reference value, the distal end device 130 further adjusts the gain of the first RF signal according to the control signal so as to generate a third radio frequency signal (third RF signal). Additionally, in some embodiments, when the distal end device 130 determines that the comparison result is that the detection signal is different from the predetermined reference value, the distal end device 130 simultaneously transmits the control signal to the connection device 120 to feed back to the proximal end device 110 and adjusts the gain of the first RF signal to generate the third RF signal.

In this embodiment, the signal processing device 100 further includes a first antenna unit 140 and a second antenna unit 150. The first antenna unit 140 is coupled to the proximal end device 110 through RF cable, and the second antenna unit 150 is coupled to the distal end device 130 through RF cable. In this embodiment, the proximal end device 110 is able to choose whether to transmit the first RF signal to the first antenna unit 140 or to transmit the first RF signal or the second RF signal to the connection unit 120. In specific, the proximal end device 110 selects to transmit the first RF signal to the first antenna unit 140 or to transmit the first RF signal or the second RF signal to the connection unit 120 based on the distance between the proximal end device 110 and the first and second antenna units 140, 150. The distance is, for example, the length of the RF cable between the proximal end device 110 and the first antenna unit 140.

For instance, when the proximal end device 110 is closer to the first antenna unit 140, where the RF cable length between the proximal end device 110 and the first antenna unit 140 is shorter than or equal to a preset length, the proximal end device 140 chooses to transmit the first RF signal to the first antenna unit 140 so that the first RF signal is transmitted to corresponding devices through the first antenna unit 140. On the other hand, when the proximal end device 110 is farther from the second antenna unit 150, where the RF cable length between the proximal end device 110 and the second antenna unit 150 is longer than the preset length, the proximal end device 110 chooses to transmit the first RF signal or the second RF signal to the distal end device 130 through the connection unit 120. The second antenna unit 150 receives and transmits the third RF signal generated by the distal end device 130 or the second RF signal transmitted by the distal end device 130 such that the second RF signal or the third RF signal is transmitted to corresponding devices for subsequent processing. In this embodiment, the preset length is 50 cm but the present disclosure is not limited thereto.

Figure 2:
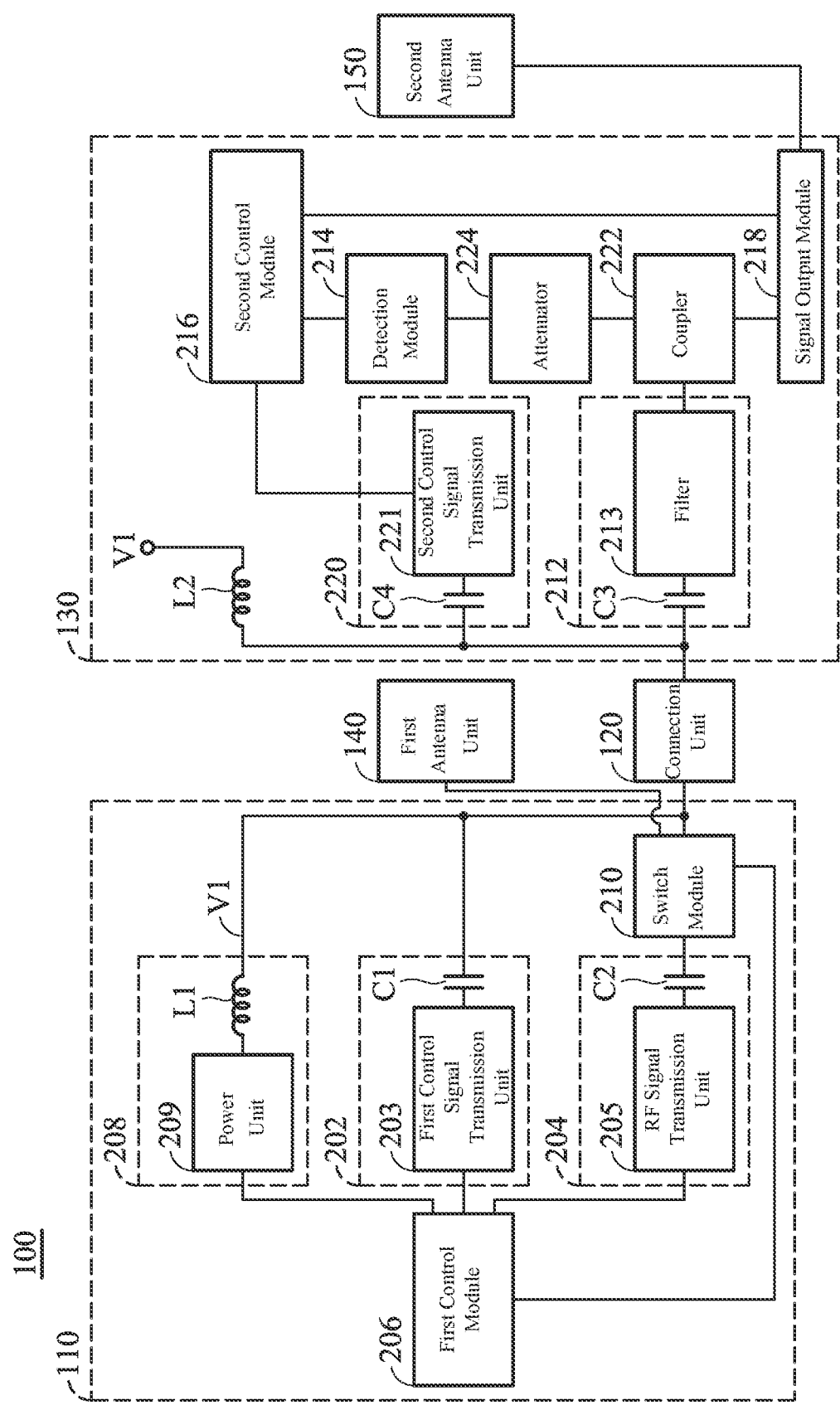
FIG. 2 is a schematic circuit diagram of the signal processing device shown in FIG. 1.

Referring to FIG. 2, the signal processing device 100 includes the proximal end device 110, the connection unit 120, the distal end device 130, the first antenna unit 140, and the second antenna unit 150. In this embodiment, the connection unit 120, the first antenna unit 140, and the second antenna unit 150 are the same as or similar to the connection unit 120, the first antenna unit 140, and the second antenna unit 150 of FIG. 1, and therefore will not be described herein.

The proximal end device 110 includes a first control signal transmission module 202, a radio frequency signal transmission module 204 (RF signal transmission module), and a first control module 206.

The first control signal transmission module 202 is coupled to the connection unit 120 and receives and transmits the control signal through the connection unit 120. More specifically, the first control signal transmission module 202 includes a first capacitor C1 and a first control signal transmission unit 203. The first capacitor C1 has a first end and a second end, and the first end of the first capacitor C1 is coupled to the connection unit 120. In this embodiment, the capacitance of the first capacitor C1 is between 100 pF and 10 nF, but the present disclosure is not limited thereto. The first control signal transmission unit 203 is coupled to the second end of the first capacitor C1 and the first control module 206, and the first control signal transmission unit 203 receives and transmits the control signal to the first control module 206 through the first capacitor C1. In some embodiments, the first control signal transmission unit 203 demodulates the control signal with intermediate frequency signal. In this embodiment, the frequency range of the intermediate frequency signal is from 10 MHz to 200 MHz, and the demodulation method includes frequency modulation (FM), frequency shift keying (FSK), and amplitude shift keying (ASK), but the present disclosure is not limited thereby.

The RF signal transmission module 204 is coupled to the connection unit 120 and receives and transmits the first RF signal or the second RF signal. In particular, the RF signal transmission module 204 includes a second capacitor C2 and a radio frequency signal transmission unit 205 (RF signal transmission unit). The second capacitor C2 has a first end and a second end, and the first end of the second capacitor C2 is coupled to the connection unit 120. In this embodiment, the capacitance of the second capacitor C2 ranges from 7 pF to 33 pF, but the present disclosure is not limited thereto. The RF signal transmission unit 205 is coupled to the second end of the second capacitor C2 and the first control module 206. The RF signal transmission unit 205 receives the first RF signal or the second RF signal generated by the first control module 206, and through the second capacitor C2, transmits the first RF signal or the second RF signal to the connection unit 120.

The first control module 206 is coupled to the RF signal transmission module 204 and the first control signal transmission module 202. The first control module 206 generates the first RF signal, and the first RF signal is transmitted to the connection unit 120 through the RF signal transmission module 204. Furthermore, the first control module 206 receives the control signal through the first control signal transmission module 202 and adjusts the first RF signal according to the control signal so as to generate the second RF signal. In this embodiment, the first control module 206 includes micro control unit (MCU) or micro-processor, but the present disclosure is not limited thereby.

More particularly, in some embodiments, the proximal end device 110 further includes a power module 208 coupled to the first control module 206 and the connection unit 120. The power module 208 can be controlled by the first control module 206 to generate a power signal V1, and the power signal V1 is transmitted to the distal end device 130 through the connection unit 120 to provide power supply required for the operation of the distal end device 130 and its internal components, such as a second control module 216, a signal output module 218, a second control signal transmission unit 221, etc.

The power module 208 further includes a first inductor L1 and a power unit 209. The first inductor L1 has a first end and a second end, and the first end of the first inductor L1 is coupled to the connection unit 120. In this embodiment, the inductance of the first inductor L1 ranges from 6.8 nH to 15.2 nH, but the present disclosure is not limited thereto.

The power unit 209 is coupled to the second end of the first inductor L1 and the first control module 206. The power unit 209 generates the power signal V1 by the control of the first control module 206, and the power signal V1 is transmitted to the distal end device 130 through the connection unit 120 to supply power to the distal end device 130 and its internal components, such as the second control module 216, the signal output module 218, the second control signal transmission unit 221, etc. for operation.

In addition, in some embodiments, the proximal end device 110 further includes a switch module 210. The switch module 210 is coupled to the first control module 206 and between the RF signal transmission module 204 and the connection unit 120. Through the control of the first control module 206, the switch module 210 selectively transmits the first RF signal to the first antenna unit 140 or transmits the first RF signal or the second RF signal to the connection unit 120.

For instance, when the proximal end device 110 is closer to the first antenna unit 140, where the RF cable length between the proximal end device 110 and the first antenna unit 140 is shorter than or equal to the preset length, the first control module 206 controls the switch module 210 to transmit the first RF signal to the first antenna unit 140, so that the first RF signal is transmitted to corresponding devices through the first antenna unit 140. On the other hand, when the proximal end device 110 is farther from the second antenna unit 150, where the RF cable length between the proximal end device 110 and the second antenna unit 150 is longer than the preset length, the first control module 206 controls the switch module 210 to transmit the first RF signal or the second RF signal to the distal end device 130 through the connection unit 120, so that the distal end device 130 can perform subsequent processing to the first RF signal or the second RF signal and then transmit it to the second antenna unit 150. In this embodiment, the preset length is 50 cm, but the present disclosure is not limited thereto.

The distal end device 130 includes a filter module 212, a detection module 214, the second control module 216, the signal output module 218, and a second control signal transmission module 220.

The filter module 212 is coupled to the connection unit 120. The filter module 212 receives the first RF signal or the second RF signal transmitted by the connection unit 120 and filters the first RF signal or the second RF signal so as to generate a filtered first RF signal or a filtered second RF signal. More particularly, the filter module 212 includes a third capacitor C3 and a filter 213. The third capacitor C3 has a first end and a second end, and the first end of the third capacitor C3 is coupled to the connection unit 120. In this embodiment, the capacitance of the third capacitor C3 ranges from 7 pF to 33 pF, but the present disclosure is not limited thereto.

The filter 213 is coupled to the second end of the third capacitor C3 and the detection module 214. The filter 213 receives the first RF signal or the second RF signal through the third capacitor C3 and filters the first RF signal or the second RF signal so as to generate the filtered first RF signal or the filtered second RF signal, and the filtered first RF signal is transmitted to the detection module 214. In this embodiment, the filter 213 is a band pass filter, but the present disclosure is not limited thereto.

The detection module 214 is coupled to the filter module 212 and performs the power detection on the filtered first RF signal so as to generate the detection signal. In other words, the detection module 214 performs the power detection on the first RF signal by converting the power value of the first RF signal to the voltage signal and uses the voltage signal as the detection signal. In this embodiment, the detection module 214 detection a small portion of the first RF signal, and the remaining portion of the first RF signal is continually transmitted to the antenna unit such as the second antenna unit 150.

The second control module 216 is coupled to the detection module 214. The second control module 216 receives the detection signal generated by the detection module 214 and generates the control signal according to the comparison result of the detection signal and the predetermined reference value. For instance, the second control module 216 compares the detection signal and the predetermined reference value through a lookup table and generates the comparison result determining whether the detection signal is the same as or similar to the predetermined reference value. In this embodiment, the second control module 216 is MCU or micro-processor, but the present disclosure is not limited thereby. In addition, the second control module 216 further includes an analog-to-digital converter (ADC) for converting the detection signal from analog to digital so as to compare the converted digital signal to the predetermined reference value.

The signal output module 218 is coupled to the filter module 212 and the second control module 216. In some embodiments, the signal output module 218 receives the filtered first RF signal and adjusts the gain of the first RF signal according to the control signal so as to generate the third RF signal. In other words, when the second control module 216 determined the comparison result to be that the detection signal is different from the predetermined reference value, the second control module 216 transmits the control signal to the signal output module 218 such that the signal output module 218 can adjust the gain of the first RF signal to generate the third RF signal. Then, the third RF signal is transmitted to corresponding devices through the second antenna unit 150. In some embodiments, the signal output module 218 receives the filtered second RF signal and outputs the second RF signal, and so the second RF signal is transmitted to corresponding devices through the second antenna unit 150. Thus, the parameters of RF signals transmitted by the distal end device 130 meet the requirements.

The second control signal transmission module 220 is coupled to the second control module 216 and the connection unit 120. The second control signal transmission module 220 receives and transmits the control signal generated by the second control module 216. In other words, when the second control module 216 determined the comparison result to be that the detection signal is different from the predetermined reference value, the second control module 216 transmits the control signal to the second control signal transmission module 220 so that the second control signal transmission transmits the control signal to the connection unit 120. The control signal is then fed back to the first control module 206 of the proximal end device 110 for the first control module 206 to adjust the first RF signal according to the control signal, so as to generate the second RF signal. In specific, the second control signal transmission module includes a fourth capacitor C4 and the second control signal transmission unit 221.

The fourth capacitor C4 has a first end and a second end, and the first end of the fourth capacitor C4 is coupled to the connection unit 120. In this embodiment, the capacitance of the fourth capacitor C4 ranges from 100 pF to 10 nF, but the present disclosure is not limited thereto. The second control signal transmission unit 221 is coupled to the second end of the fourth capacitor C4 and the second control module 216. The second control signal transmission unit 221 receives the control signal generated by the second control module 216, and the control signal is transmitted to the connection unit 120 through the fourth capacitor C4. In some embodiments, the second control signal transmission unit 221 modulates the control signal with intermediate frequency signals, and the intermediate frequency signals has a frequency range of 10 MHz to 200 Mhz. The modulation method includes FM, FSK, and ASK, but the present disclosure is not limited thereby.

Then, the intermediate-frequency modulated control signal is transmitted to the first control signal transmission unit 203 through the connection unit 120. The intermediate-frequency modulated control signal is subsequently demodulated with intermediate frequency signals by the first control signal transmission unit 203, and the demodulated control signal is transmitted to the first control module 206 for the first control module 206 to adjust the first RF signal according to the control signal, so as to generate the second RF signal.

Moreover, in some embodiments, the distal end device 130 further includes a coupler 222 and an attenuator 224. The coupler 222 is coupled between the filter module 212 and the signal output module 218. The coupler 222 performs a coupling process to the filtered first RF signal or the filtered second RF signal generated by the filter module 212 and transmits the coupling-processed first RF signal or the coupling-processed second RF signal to the signal output module 218 for subsequent processing. In this embodiment, the coupler 222 has a coupling frequency of 10 dB, but the present disclosure is not limited thereto.

The attenuator 224 is coupled between the coupler 222 and the detection module 214. The attenuator 224 performs a signal attenuation process to the coupling-processed first RF signal generated by the coupler 222 and transmits the signal-attenuated first RF signal to the detection module 214 so the first RF signal undergoes the power detection by the detection module 214. In this embodiment, the attenuation frequency of the attenuator 224 is 20 dB, but the present disclosure is not limited thereto.

Also, in some embodiments, the distal end device 130 further includes a second inductor L2. The second inductor L2 has a first end and a second end, and the first end of the second inductor L2 is coupled to the connection unit 120. The second end of the second inductor L2 is coupled to the power signal V1, and the power signal V1 provides power supply to the second control module 216, the signal output module 218, and the second control signal transmission unit 221, etc.

Referring to FIG. 1 and FIG. 2, the signal processing device 100 includes the first antenna unit 140 and the second antenna unit 150, but the present disclosure is not limited thereby. In some embodiments, the signal processing device 100 only has the second antenna unit 150 and not the first antenna unit 140. When the signal processing device 100 does not have the first antenna unit 140, the proximal end device 110 does not need the switch module 210, and in turn the RF signal transmission module 204 is coupled to the connection unit 120 without the switch module 210.

As such, the signal processing device of the present disclosure uses the proximal end device to generate the first RF signal, the connection unit to transmit the first RF signal, and the distal end device to receive the first RF signal, perform power detection on the first RF signal, generate the detection signal, generate the control signal according to the comparison result of the detection signal and the predetermined reference value, and transmit the control signal to the connection unit. The proximal end device further receives the control signal through the connection unit and adjusts the signal parameters of the first RF signal according to the control signal. Moreover, the control signal, the power signal, and the RF signal (the first RF signal or the second RF signal) are transmitted by the same connection unit (RF cable). Hence, the RF signal is effectively adjusted or compensated for the signal loss through bi-directional linear close-loop control, and the signal linearity and the signal coverage are enhanced as well as the convenience of utility.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A signal processing device comprising:
    a proximal end device, for generating a first radio frequency signal;
    a connection unit, coupled to the proximal end device for receiving and transmitting the first radio frequency signal; and
    a distal end device, coupled to the connection unit for receiving the first radio frequency signal, wherein the distal end device performs a power detection on the first radio frequency signal to generate a detection signal, generates a control signal according to a comparison result of the detection signal and a predetermined reference value, and transmits the control signal to the connection unit;
    wherein the proximal end device receives the control signal through the connection unit and adjusts the first radio frequency signal according to the control signal, so as to generate a second radio frequency signal.

2. The signal processing device according to claim 1, wherein the proximal end device comprises:
    a first control signal transmission module, coupled to the connection unit for receiving and transmitting the control signal through the connection unit;
    a radio frequency signal transmission module, coupled to the connection unit for receiving and transmitting the first radio frequency signal or the second radio frequency signal; and
    a first control module, coupled to the radio frequency signal transmission module and the first control signal transmission module, wherein the first control module generates the first radio frequency signal, receives the control signal, and adjusts the first radio frequency signal according to the control signal so as to generate the second radio frequency signal.

3. The signal processing device according to claim 2, wherein the first control signal transmission module comprises:
    a first capacitor, comprising a first end and a second end and coupled to the connection unit with the first end; and
    a first control signal transmission unit, coupled to the second end of the first capacitor and the first control module.

4. The signal processing device according to claim 2, wherein the radio frequency signal transmission module comprises:
    a second capacitor, comprising a first end and a second end and coupled to the connection unit with the first end; and
    a radio frequency transmission unit, coupled to the second end of the second capacitor and the first control module.

5. The signal processing device according to claim 2, wherein the proximal end device further comprises:
    a power module, coupled to the first control module and the connection unit, wherein the power module is controlled by the first control module to generate a power signal, and the power signal is transmitted to the distal end device through the connection unit.

6. The signal processing device according to claim 5, wherein the power module comprises:
    a first inductor, comprising a first end and a second end and coupled to the connection unit with the first end; and
    a power unit, coupled to the second end of the inductor and the first control module.

7. The signal processing device according to claim 1, further comprising:
    a first antenna unit, coupled to the proximal end device, wherein the first antenna unit receives and transmits the first radio frequency signal.

8. The signal processing device according to claim 7, wherein the proximal end device further comprises:
    a switch module, coupled to the first control module and between the radio frequency signal transmission module and the connection unit, wherein the switch module is controlled by the first control module to transmit the first radio frequency signal to a first antenna unit or to transmit the first radio frequency signal or the second radio frequency signal to the connection unit.

9. The signal processing device according to claim 1, wherein the connection unit is a radio frequency cable.

10. The signal processing device according to claim 1, wherein the distal end device comprises:
    a filter module, coupled to the connection unit for receiving the first radio frequency signal or the second radio frequency signal and filtering the first radio frequency signal or the second radio frequency signal so as to generate the filtered first radio frequency signal or the filtered second radio frequency signal;
    a detection module, coupled to the filter module for performing the power detection on the filtered first radio frequency signal to generate the detection signal;
    a second control module, coupled to the detection module for receiving the detection signal and generating the control signal according to the comparison result of the detection signal and the predetermined reference value; and
    a second control signal transmission module, coupled to the second control module and the connection unit for receiving and transmitting the control signal.

11. The signal processing device according to claim 10, wherein the filter module comprises:
    a third capacitor, comprising a first end and a second end and coupled to the connection unit with the first end; and a filter, coupled to the second end of the third capacitor and the detection module.

12. The signal processing device according to claim 11, wherein the filter is a band pass filter.

13. The signal processing device according to claim 10, wherein the second control signal transmission module comprises:
   a fourth capacitor, comprising a first end and a second end and coupled to the connection unit with the first end; and
   a second control signal transmission unit, coupled to the second end of the fourth capacitor and the second control module.

14. The signal processing device according to claim 10, wherein the distal end device further comprises:
   a second inductor, comprising a first end and a second end, coupled to the connection unit with the first end, and coupled to a power signal with the second end.

15. The signal processing device according to claim 10, wherein the distal end device further adjusts a gain of the first radio frequency signal according to the control signal so as to generate a third radio frequency signal, or outputs the second radio frequency signal.

16. The signal processing device according to claim 15, wherein the distal end device further comprises:
   a signal output module, coupled to the filter module and the second control module for receiving the filtered first radio frequency signal or the filtered second radio frequency signal,
   wherein, when the signal output module receives the filtered first radio frequency signal, the signal output module adjusts the gain of the first radio frequency signal according to the control signal so as to generate the third radio frequency signal; and
   when the signal output module receives the filtered second radio frequency signal, the signal output module outputs the second radio frequency signal.

17. The signal processing device according to claim 16, wherein the distal end device further comprises:
   a coupler, coupled between the filter module and the signal output module; and
   an attenuator, coupled between the coupler and the detection module.

18. The signal processing device according to claim 15, further comprising:
   a second antenna unit, coupled to the distal end device for receiving and transmitting the second radio frequency signal or the third radio frequency signal.

* * * * *